(12) United States Patent
Chen et al.

(10) Patent No.: US 8,032,934 B2
(45) Date of Patent: Oct. 4, 2011

(54) NETWORK SECURITY SYSTEM AND THE METHOD THEREOF

(75) Inventors: Xianyi Chen, Shenzhen (CN); Ziqiang Wei, Shenzhen (CN); Jiaoli Wu, Shenzhen (CN); Enkui Wang, Shenzhen (CN); Lingfeng Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1490 days.

(21) Appl. No.: 10/585,264

(22) PCT Filed: Dec. 29, 2004

(86) PCT No.: PCT/CN2004/001557
§ 371 (c)(1),
(2), (4) Date: Jul. 5, 2006

(87) PCT Pub. No.: WO2005/067204
PCT Pub. Date: Jul. 21, 2005

(65) Prior Publication Data
US 2007/0192844 A1    Aug. 16, 2007

(30) Foreign Application Priority Data
Jan. 5, 2004    (CN) .......................... 2004 1 0000042

(51) Int. Cl.
*G06F 9/00* (2006.01)
(52) U.S. Cl. ............. 726/14; 726/12; 713/153; 709/231

(58) Field of Classification Search .................... 726/12, 726/14; 713/153; 709/231; 370/235
See application file for complete search history.

(56) References Cited

U.S. PATENT DOCUMENTS

| 7,076,393 B2 * | 7/2006 | Ormazabal et al. ........... 702/122 |
| 7,522,594 B2 * | 4/2009 | Piche et al. .................. 370/389 |
| 7,602,784 B2 * | 10/2009 | Piche et al. .................. 370/392 |
| 2003/0140142 A1 * | 7/2003 | Marples et al. ............... 709/225 |
| 2007/0067487 A1 * | 3/2007 | Freebairn et al. ............. 709/238 |
| 2009/0019141 A1 * | 1/2009 | Bush et al. .................... 709/223 |

FOREIGN PATENT DOCUMENTS
CN    1440604    3/2001

* cited by examiner

*Primary Examiner* — Eleni Shiferaw
*Assistant Examiner* — Paul Callahan
(74) *Attorney, Agent, or Firm* — Finnegan, Henderson, Farabow, Garrett & Dunner LLP

(57) ABSTRACT

The present invention discloses a network security system including a firewall arranged between the internal network and the external network, and a trusted node arranged between the firewall and the external network, which is used to provide a data channel between the internal network and the external network, and forward the data transported between the internal network and the external network; the firewall includes a first port configured at the internal network oriented side of the firewall and a second port configured at the external network oriented side of the firewall; and the trusted node includes a media-stream receiving port used to converge the data from the second port. The present invention also discloses a network security method.

6 Claims, 4 Drawing Sheets

NETWORK SECURITY SYSTEM AND THE
METHOD THEREOF

FIELD OF THE INVENTION

The present invention relates to the network security technology in the field of electronics or telecommunication. More particularly, the present invention relates to a network security system and a method thereof.

BACKGROUND OF THE INVENTION

In recent years, with the increase of the number of the Internet users, more and more service applications based on IP (Internet Protocol) networks have come forth. IP technologies have become the mainstream technologies used to construct network applications, but at the same time, its inherent essential characteristics of being simple and opening have not been changed substantially, which leaves hidden troubles for the occurrence of network security problems. Especially for enterprise users, because of the existence of the hidden troubles mentioned above, business secrets are most likely to become the data without any security due to vicious attacks of hackers when they are transported on the Internet, and this will be more serious for financial enterprise users such as bank, insurance business, securities business, etc.

Therefore, it has been a problem to be obviated urgently for the enterprises to ensure the security of the data transport. At present, to ensure the internal network (Cell, Intranet) of a user free from attacks of the external network, the common method is to arrange a firewall at the egress of the internal network, so as to isolate the internal network from the external network to guarantee the security. However, when the above method is applied to video communication (especially multi-point video communication), many ports need to be opened on the firewall and the internal network needs to communicate with multiple outside nodes (insecure nodes), thereby the isolation function of the firewall will be degraded and the risk of being attacked for the internal network will be increased accordingly.

To overcome the above-mentioned hidden troubles in video communication, the following technical scheme is generally adopted in the prior art:

FIG. 1 shows a firewall security system of the prior art, in which: there is a firewall 30 arranged between the internal network 10 and the external network 20, and there are network proxies 41 and 42 respectively arranged inside the firewall 30 and outside the firewall 30. All video streams from the internal network 10 to the external network 20 pass through the network proxy 41 first, and after multiplexing the streams and the signaling, the network proxy 41 transmits them to the network proxy 42 outside the firewall 30, and then network proxy 42 de-multiplexes the received streams and transmits them to the corresponding nodes. In a similar way, the streams and the signaling from the external network 20 pass through the network proxy 42 first, and after multiplexing the streams and the signaling, the network proxy 42 transmits them to the network proxy 41. However, the system of the prior art has some disadvantages:

1. Since the transport procedure relates to both the multiplexing and the de-multiplexing of the streams, it needs a procedure of mixing the data from multiple nodes and inserting identifiers into the mixed data, as well as a procedure of separating the multiplexed data into the data of respective nodes according to the identifiers. It takes times to execute such procedures, which increase the time delay of processing and make great influence on the service requests with high real-time demand, such as video communication. At the same time, the data pass through the network proxies 41 and 42, which also increases the time delay.

2. Two network proxies 41 and 42 are introduced in the system, which greatly increases the cost of the whole system.

SUMMARY OF THE INVENTION

The present invention provides a network security system and a method thereof, so as to obviate the problem of the time delay in the data transport of the prior art.

The present invention provides the technical solutions as follows:

A network security system includes a firewall arranged between an internal network and an external network, and the firewall includes a first port configured at the internal network oriented side of the firewall and a second port configured at the external network oriented side of the firewall; wherein the network security system further includes a trusted node arranged between the firewall and the external network, which is used to provide a data channel between the internal network and external network, and forward the data transported between the internal network and external network; and the trusted node includes a media-stream receiving port used to converge the data from the second port.

A network security method for realizing secure communication between the internal network and the external network by utilizing a network security system, which includes a firewall arranged between the internal network and the external network, a first port and a second port configured at the both sides of the firewall respectively, and a trusted node arranged between the firewall and the external network; and the trusted node includes a media-stream receiving port; wherein the network security method includes the following steps of: establishing a call connection between the internal network and the external network by means of the trusted node; selecting a media-stream receiving port for communicating with the internal network in the trusted node; the trusted node forwarding the data transported between the internal network and the external network, and at the same time, converging the data from the second port by the selected media-stream receiving port.

Compared with the prior art, the present invention provides the beneficial effects as:

1. In the present invention, a trusted node is introduced between the firewall and the external network, and all the data transported between the external network and the internal network are required to pass through the trusted node first; moreover, a second port corresponding to the trusted node is configured at the external network oriented side of the firewall, and the data transported between the trusted node and the internal network are converged through the same media-stream receiving port, such that the trusted node only needs to implement the forwarding of the data, therefore the procedure of multiplexing/de-multiplexing in the prior art may be avoided and the time delay of data streams will not be increased on the whole; additionally, since the data pass through only one device, i.e. the trusted node, the time delay will be decreased in respect to the prior art.

2. Since all internal nodes can communicate only with the trusted node, trusted nodes can be configured definitely in the firewall, such that the communication initiated by an internal node to any other external nodes (untrusted nodes) can be rejected by the firewall, thus increasing the security of the network, and more severe limits to the trusted node can be configured on the firewall; moreover, port convergence is realized between the trusted node and the internal nodes; all of these mentioned above allows to reduce the port number to be opened in the transport layer of the firewall, simplify the configuration, ensure the isolation between the internal network and the external network, and enhance the network security.

3. Since only the trusted node is introduced, the cost of the system will be reduced in respect to the prior art.

4. Multiple trusted nodes can be deployed as required to realize load balance, so the present invention has very good scalability.

DETAILED DESCRIPTION OF THE PREFERRED EMBODIMENTS

Figure 1:
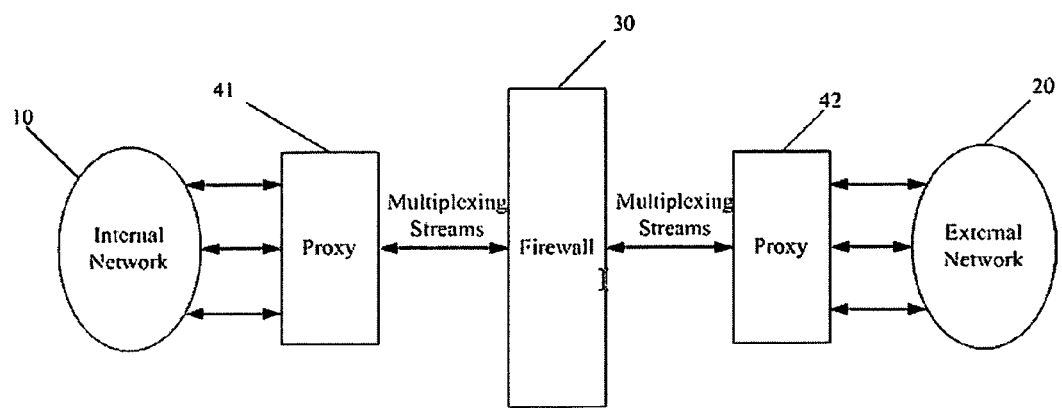
FIG. 1 is a block diagram illuminating a network security system of the prior art.
Figure 2:
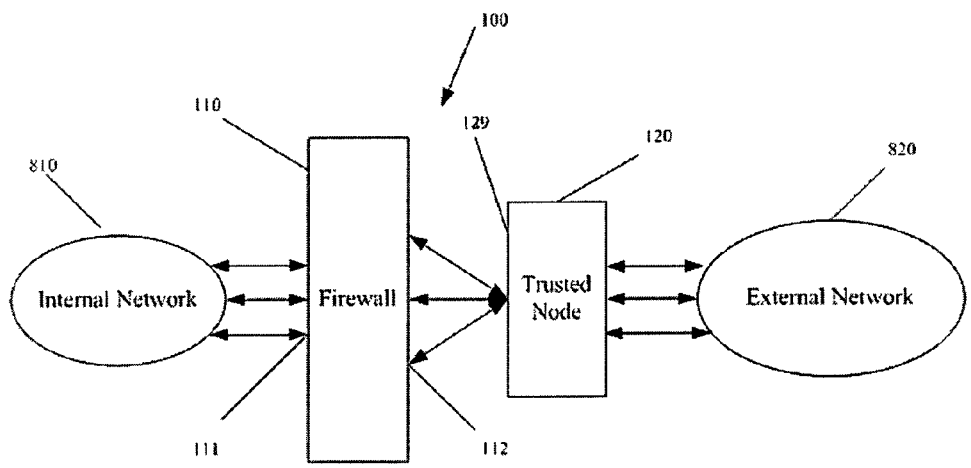
FIG. 2 is a schematic diagram illuminating the network security system according to an embodiment of the present invention.

FIG. 2 is a schematic diagram illuminating the network security system according to an embodiment of the present invention. The network security system 100 is designed to support H.323 protocol, which, as a part of the ITU (International Telecommunication Union) Multimedia Communication Series Criterion H.32x, makes it possible to carry on video conferences over the current communication networks and provides a criterion of multimedia communication for the current packet network (e.g. IP network). If combining H.323 with other IP technologies, such as RSVP (Resource Reservation Protocol) of IETF (Internet Engineering Task Force), multimedia communication over IP network can be realized. In H.323 protocol, RTP (Real-time Transport Protocol) of IETF is adopted as the real-time transport protocol.

The network security system 100 is arranged between the internal network 810 and the external network 820, for isolating the internal network 810 and the external network 820, and providing a data transport channel between the internal network 810 and the external network 820. The network security system 100 consists of a firewall 110 and a trusted node 120, wherein the firewall 110 is arranged between the internal network 810 and the external network 820, and the trusted node 120 is arranged between the firewall 110 and the external network 820.

The firewall 110 may be any one type of firewalls in the prior art, and mainly serves to isolate the internal network 810 and the external network 820. To exchange data between the internal network and the external network and develop necessary network applications, such as video communication, there are provided a plurality of first ports 111 at the internal network oriented side of the firewall 110 (i.e. between the firewall 110 and the internal network 810), and a plurality of second ports 112 at the external network oriented side of the firewall 110 (i.e. between the firewall 110 and the external network 820), wherein the second ports 112 correspond to the trusted node 120.

The trusted node 120 refers to that this node is trusted, and the data transmitted by the trusted node 120 will not cause damage to the internal network 810 and the networks or machines of the user. The selection of the trusted node is confirmed by the administrator of the internal network according to different applications. The trusted node 120 has a media-stream receiving port 129, and the data transmitted between the trusted node 120 and the internal network 810 are converged through the media-stream receiving port 129.

Figure 3:
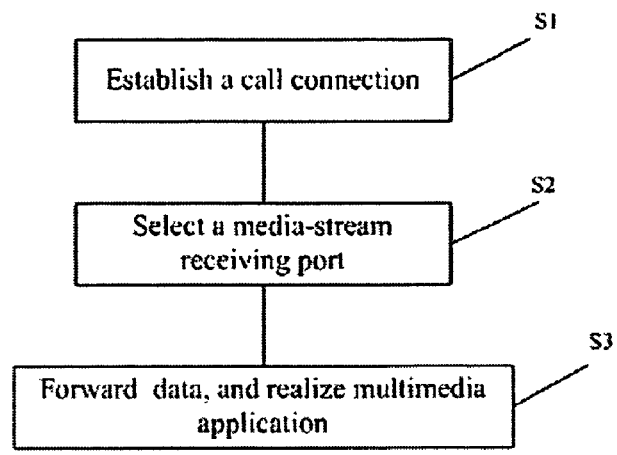
FIG. 3 is a flow chart illuminating the network security method according to an embodiment of the present invention.

Referring to FIG. 2 and FIG. 3, the network security method according to an embodiment of the present invention realizes secure communication between the internal network 810 and the external network 820 utilizing the network security system 100, the method includes: Step S1, establishing a call connection between the internal network 810 and the external network 820 through the trusted node 120; Step S2, selecting the media-stream receiving port 129; and Step S3, the trusted node 120 forwarding the data transported between the internal network and the external network. Wherein all the signaling from the internal network 810 is transmitted to the same port of the trusted node 120 and the convergence of signaling port can be implemented by the H.245 tunnel of H.323. The trusted node 120 selects a media-stream receiving port 129 with which the trusted node 120 communicates with the internal network 810 when the trusted node 120 opens a logical channel through H.245 signaling, wherein the second port 112 of the firewall 110 corresponds to the media-stream receiving port 129 of the trusted node 120, and informs the internal network 810 of the same media-stream receiving port 129. Since streams are transmitted to the same port of the trusted node 120, i.e. the media-stream receiving port 129, the data transported between the trusted node 120 and the internal network 810 are converged through the media-stream receiving port 129. Then the trusted node 120 transmits the signaling and streams to the external network 820. In a similar way, the trusted node 120 receives the signaling and streams from the external network 820, and transmits them to the internal network 810 though the transport channel.

Figure 4:
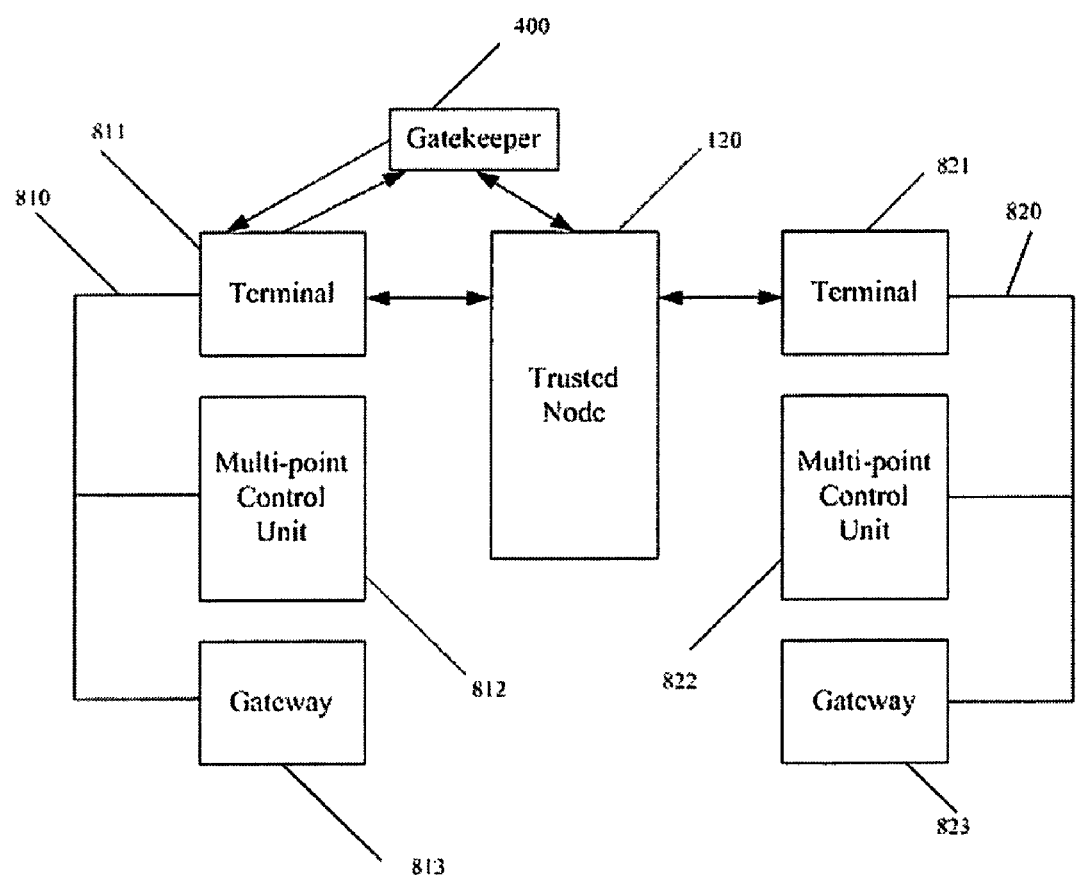
FIG. 4 is a structure diagram of the network security system according to an embodiment of the present invention.

Referring to FIG. 4, it shows an implementation of the network system according to an embodiment of the present invention. As shown in FIG. 4, the internal network 810 includes a plurality of internal nodes, such as the terminal 811, the multi-point control unit 812 and the gateway 813 etc., and the external network 810 also includes a plurality of external nodes such as the terminal 821, the multi-point control unit 822 and the gateway 823 etc. The firewall 110 (see FIG. 2) and the trusted node 120 isolate the internal network 810 and the external network 820, and provide a data transport channel between the internal network 810 and the external network 820, herein the firewall 110 is transparent with respect to the trusted node 120.

The network security system 110 further includes the gatekeeper 400; in the networks, the internal nodes 811 to 813, the external nodes 821 to 823, and the trusted node 120 are all registered on the gatekeeper 400. The gatekeeper 400 functions to provide call control service for each node in the networks, which is required to provide the following four services of address translation, bandwidth control, admission control and regional management, and which can optionally provide the functions of bandwidth management, call authorization, call control signaling and call management etc. Although the gatekeeper 400 are separated from all other nodes in the network logically, the manufacturers can integrate the functions of the gatekeeper 400 into the physical equipments of the terminals 811 and 821, the multi-point control units 812 and 822, and the gateways 813 and 823 and the like. The aggregation of the terminals 811 and 822, the multi-point control units 812 and 822 and the gateways 813 and 823 managed by the gatekeeper 400 is called a domain.

Figure 5:
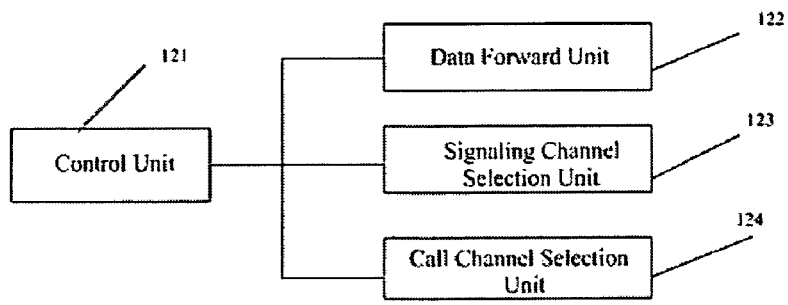
FIG. 5 is a block diagram illuminating the trusted node shown in FIG. 4.

Referring to FIG. 5, the trusted node 120 further includes the control unit 121, the data forward unit 122, the signaling channel selection unit 123 and the call channel selection unit 124, wherein the control unit 121 controls the other units, the data forward unit 122 forwards the data transported between the internal network 810 and the external network 820, the signaling channel selection unit 123 transports the signaling by employing the Q931 channel, and the call channel selection unit 124 selects the channel for the data transported between the internal network 810 and the external network 820, i.e. selects the media-stream receiving port 129 for the communication between the trusted node 120 and the internal network 810. The trusted node 120 is designed to support H.323 protocol, wherein RAS (Registration, Admission, and Status) is adopted to implement the registration of the trusted node 120 on the gatekeeper 400; H.225.0 protocol is adopted to establish a call model; H.245 protocol (Multimedia Communication Control Protocol) is adopted to provide the end-to-end signaling and ensure the normal communication between the internal network 810 and the external network 820. H.245 protocol defines four types of information, i.e. Request, Answer, Signaling and Indication, so as to implement the control of communication through operations such as communication capability negotiation among various nodes, opening/closing the logical channel, transmitting commands or indications and the like.

Figure 6:
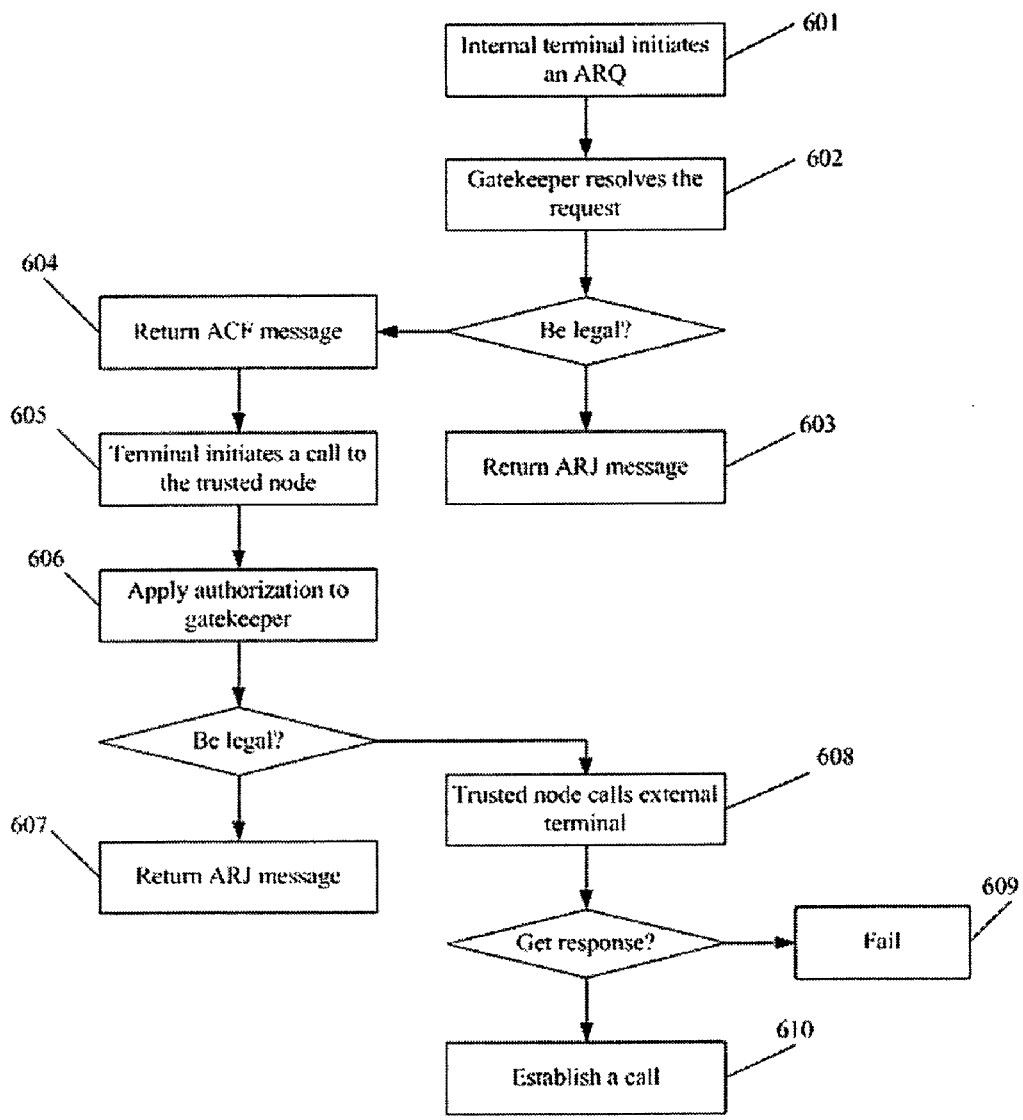
FIG. 6 is a flow chart illuminating the call establishment in the network security method according to an embodiment of the present invention.

Referring to FIG. 4, FIG. 5, and FIG. 6, the flow of the call establishment in the network security method according to an embodiment of the present invention will be illustrated by taking the video communication between the internal terminal 811 and the external terminal 821 as example, the flow including the following:

1. at Step 601, an ARQ (Admission Request) is transmitted by the terminal 811 to the gatekeeper 400 to which the terminal 811 is registered to implement user access authentication;

2. at Step 602, the gatekeeper 400 resolves the ARQ, and judges whether the ARQ is legal; if the ARQ is illegal, the flow goes to Step 603, in which step the gatekeeper 400 returns an ARJ (Admission Reject) message which generally contains the reason of the failure;

3. if the ARQ is legal, the flow goes to Step 604, in which step the gatekeeper 400 returns an ACF (Admission Confirm) message which contains the address of the trusted node 120 to implement admission confirmation;

4. at Step 605, a call is initiated by the terminal 811 to the trusted node 120, and the call message contains the user information of the called node, i.e. the terminal 821;

5. at Step 606, the trusted node 120 transmits the relevant messages to the gatekeeper 400 to apply authorization; if the call is illegal, the flow goes to Step 607, in which step the gatekeeper 400 returns an ARJ (Admission Reject) message which generally contains the reason of failure;

6. if the call is legal, the flow goes to Step 608, in which step the trusted node 120 calls the called node, i.e. the terminal 821;

7. if there is no response from the terminal 821, the flow goes to Step 609, in which step the trusted node 120 returns a failure message to the terminal 811; otherwise, the flow goes to Step 610, in which step the trusted node 120 forwards the response to the calling node, i.e. the terminal 811 to establish the call.

Figure 7:
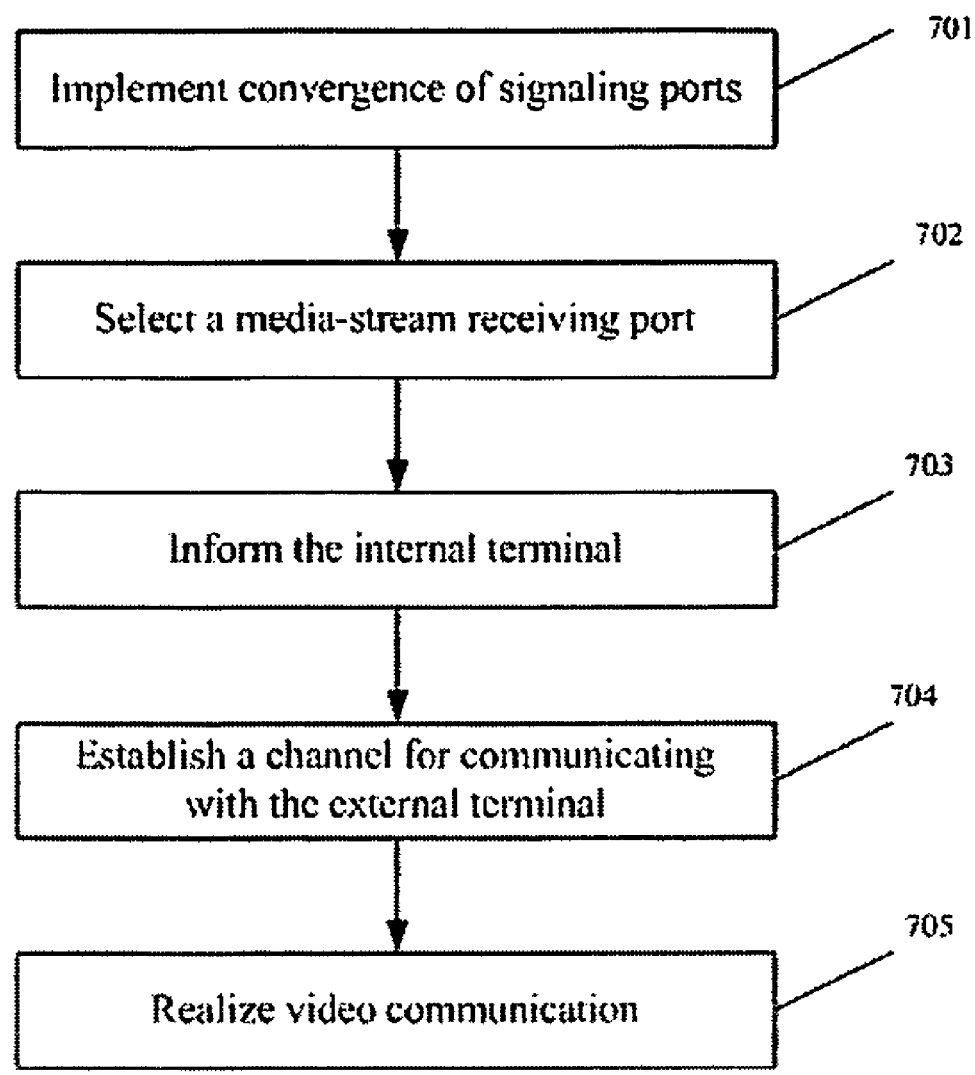
FIG. 7 is a flow chart illuminating the data transport in the network security method according to an embodiment of the present invention.

Referring to FIG. 4, FIG. 5 and FIG. 7, the detailed data transport method of the network security method according to an embodiment of the present invention includes the following steps:

Step 701: the trusted node 120 forwards the signaling of capacity exchange, master and slave determination between the terminal 811 and the terminal 821, etc.; the signaling channel selection unit 123 adopts Q931 channel for transmitting signaling, which makes all signaling be transported through Q931 channel, therefore achieving the convergence of the signaling ports;

Step 702: OLC (Open Logical Channel) signaling which contains the description about the transmitted data is transmitted by the calling node, i.e. the terminal 811, to the trusted node 120, and the call channel selection unit 124 selects a specific media-stream receiving port 129; in general cases, a logical channel can be opened only if the terminal 811 and the terminal 821 are capable of receiving all the data of the open channel simultaneously;

Step 703: the trusted node 120 informs the terminal 811 of its IP address and the selected media-stream receiving port 129; since all the nodes of the internal network 810 adopts the same media-stream receiving port 129, the convergence of media streams can be implemented;

Step 704: the trusted node 120 transmits OLC signaling to the terminal 821 to establish a corresponding channel; after passing through the trusted node 120, all the streams sent by the nodes of the external network 820 are transmitted to the internal network 810 via the same media-stream receiving port 129;

Step 705: under the control of the control unit 121, the data forward unit 122 of the trusted node 120 receives the streams from the terminal 811 and the terminal 821, and forwards them to the corresponding terminal 821 and terminal 811 so as to realize video communication.

What mentioned above is the video communication initiated by the terminal 811 of the internal network 810 to the terminal 821 of the external network 820, and the terminal 821 can also initiates a call to the terminal 811. Of course, data transport between the other nodes of the internal network 810 and the other nodes of the external network 820 can also be implemented by means of the method and the system according to an embodiment of the present invention.

According to the present invention, a plurality of the trusted nodes 120 also can be deployed at the same time. If a certain trusted node 120 reaches its bandwidth limit, it will reports to the gatekeeper 400 that the resource is not available, and the gatekeeper 400 can reassign the call to another trusted node 120 to implement load balance. Therefore good scalability can be achieved.

Since the trusted node 120 is introduced into the present invention, the destination of the data transport of the internal network 810 is only the trusted node 120; a limit can be configured in the firewall 110, that is only the communication to the trusted node 120 can be admitted to pass through the firewall, which increases the security of the network. Further more, all the video communication between the internal nodes and the external nodes pass through the trusted node 120, and all the signaling and streams between the trusted node 120 and internal nodes are converged, which therefore avoid the opening of too many ports of the firewall 110 and the multiplexing/de-multiplexing of streams, accordingly, time delay will not be increased on the whole.

What mentioned above are preferred embodiments of the present invention. It will be understood by those skilled in the art that various changes and modifications may be made therein without departing from the spirit and scope of the present invention as defined by the appended claims, and such changes and modifications are intended to fall into the scope of the present invention.

The invention claimed is:

1. A network security method of realizing secure communication between the internal network and the external network by utilizing a network security system, said network security system comprises a firewall arranged between the internal network and the external network, a first port and a second port configured at the both sides of the firewall, and a trusted node arranged between the firewall and the external network;

wherein the trusted node comprises:
- a media-stream receiving port;
- a data forward unit, which is used to forward the data transported between the internal network and the external network;
- a signaling channel selection unit, which is used to select signaling transmission channel for transmitting the data so as to implement the convergence of signaling;
- a call channel selection unit, which is used to select a media-stream receiving port in the trusted node for communicating with the internal network; and
- a control unit, which is used to control the operations of all the other units;

wherein the network security method comprises:
- A. establishing a call connection between the internal network and the external network by means of the trusted node;
- B. selecting a media-stream receiving port for communicating with the internal network in the trusted node; and
- C. the trusted node forwarding the data transported between the internal network and the external network, and at the same time, converging the data from the second port by the selected media-stream receiving port;

wherein Step B comprises:
- B1. transmitting an Open Logical Channel signaling, by the internal network, to the trusted node;
- B2. the trusted node informing the internal network of the selected media-stream receiving port; and
- B3. the trusted node transmitting the Open Logical Channel signaling to the external network to establish a corresponding channel.

2. The network security method according to claim 1, wherein the Step C comprises the following:
- C1. the selected media-stream receiving port of the trusted node receiving all the data from the internal network, and forwarding the data to the external network;
- C2. the selected media-stream receiving port of the trusted node forwarding the data transmitted by the external network to the internal network.

3. The network security method according to claim 2, further comprises a step of implementing load balance among a plurality of trusted nodes when the data are forwarded.

4. The network security method according to claim 1, wherein the Step A comprises a step of selecting Q931 channel for transmitting signaling.

5. The network security method according to claim 4, further comprises a step of implementing load balance among a plurality of trusted nodes when the data are forwarded.

6. The network security method according to claim 1, further comprises a step of implementing load balance among a plurality of trusted nodes when the data are forwarded.

* * * * *